United States Patent [19]

Schulz et al.

[11] 4,320,223

[45] Mar. 16, 1982

[54] MOLDED EPOXY RESIN PRODUCT CONTAINING ACIDS FROM OXIDATION OF CARBONACEOUS MATERIALS AND PROCESS FOR PRODUCING SAME

[75] Inventors: Johann G. Schulz, Pittsburgh; Walter P. Barie, Jr., Glenshaw; James T. Eurich, Marwood, all of Pa.

[73] Assignee: Gulf Research & Development Corp., Pittsburgh, Pa.

[21] Appl. No.: 209,595

[22] Filed: Nov. 24, 1980

[51] Int. Cl.$^3$ ............................................. C08G 59/42
[52] U.S. Cl. ................................... 527/501; 525/507; 528/365
[58] Field of Search ...................... 528/112, 115, 365; 260/28 R

[56] References Cited

U.S. PATENT DOCUMENTS 3,222,280 12/1965 Wolfram et al. ............... 528/365 X
3,304,344 2/1967 Szalowski ..................... 528/115 X
4,101,469 7/1978 Schulz et al. ................... 521/143 X
4,122,050 10/1978 Schulz et al. ......................... 521/95

Primary Examiner—Earl A. Nielsen
Attorney, Agent, or Firm—Arnold, White & Durkee

[57] ABSTRACT

Novel, 1,2-Epoxy Resin products using unique polycyclic, aromatic, polycarboxylic acid products as crosslinking agents display satisfactory electrical properties and good Barcol hardness values. The process for preparing these novel resin products involves admixing: a 1,2-epoxy resin containing on the average more than one 1,2-epoxy groups per molecule and the acid product derived from the nitric acid oxidation of naturally occurring solid carbonaceous material along with a suitable accelerator. The mixture is then subjected to a precure step which involves heating at temperatures between 50° and 150° C. for from about five minutes to about six hours. The mixture is thereafter subjected to suitable molding conditions.

16 Claims, No Drawings

MOLDED EPOXY RESIN PRODUCT CONTAINING ACIDS FROM OXIDATION OF CARBONACEOUS MATERIALS AND PROCESS FOR PRODUCING SAME

This invention relates to new and useful molding compositions capable of being molded to solid resinous materials having good Barcol hardness and excellent electrical insulating properties. More particularly, this invention relates to novel 1,2-epoxy resin molding compositions which are convertible into hard, infusable, solid cross-linked polymers by curing under suitable molding conditions. The compositions of the present invention are formed by the coupling process wherein the epoxy resin precursor is reacted with specific poly-functional cross-linking agents to couple or cross-link one epoxy resin molecule with another.

The properties of the final epoxy resin compositions will depend, to a large degree, on the nature of the specific 1,2-epoxy resin precursor and of the particular cross-linking agent employed to produce the final polymer. An example of epoxy resin compositions capable of being cured to solid resins which are resistant to boiling acetone as a result of the unique characteristics of the particular poly-functional cross-linking agent employed to produce the composition, are those compositions described in U.S. Pat. No. 4,147,856. The unique properties of the epoxy resin compositions of the present invention are due, in large part, to the unique poly-functional materials to be employed as cross-linking agents. These materials may be described generally as the polycyclic, aromatic, polycarboxylic acid products obtained from the nitric acid oxidation of naturally occurring solid carbonaceous materials such as coal.

In U.S. Pat. Nos. 4,122,050 and 4,101,469, there are disclosed foamable compositions comprising mixtures of thermoplastic or thermosetting resinous polymers with some of the polycyclic, aromatic, polycarboxylic acids produced by the nitric acid oxidation of carbonaceous materials, such as coal. Included among the thermosetting resins suitable for use to produce the foamable compositions therein disclosed are epoxy resin formulations, such as a 1,2-epoxy resin in combination with a poly-functional cross-linking agent.

It has now been discovered that the polycyclic, aromatic, polycarboxylic acids derived from carbonaceous materials such as coal, are capable of functioning directly as cross-linking agents with epoxy resin formulations, without the need for any additional poly-functional cross-linking material. Applicants have developed a process whereby epoxy resin compositions may be produced, which withstand the high temperatures and pressures of typical molding operations without the poly-functional material decomposing or generating gaseous materials to any significant degree. The result is the production of moldable epoxy resin compositions capable of being molded to produce solid materials having good Barcol hardness and excellent electrical properties.

SUMMARY OF THE INVENTION

We have discovered the process for producing moldable epoxy resin compositions capable of being cured under suitable molding conditions into a solid resinous material having improved hardness and dielectric properties. According to the process of the present invention, we first prepared a curable mixture comprising (i) A 1,2-epoxy resin containing on the average more than one 1,2-epoxy groups per molecule, and
(ii) The acid product derived from the nitric acid oxidation of naturally occurring solid carbonaceous material, along with a suitable accelerator.

The epoxy resin to be used in the preparation of this curable mixture should be a solid material, because it is to be comminuted in admixture with the solid acid products and the accelerator to produce a moldable composition. Accordingly, epoxy resin should have a molecular weight of at least about 75 to 4000 and a Durran melting point between about 50° to 150° C. As the acid products contemplated for use according to the process of the present invention typically have a neutral acid equivalent between about 150 and 300, and for most uses it is desirable to develop a stoichiometrically balanced mixture of epoxy resin and cross-linking agent, the epoxide equivalent of the epoxy resin should be at least between about 400 to 2500. We have found it acceptable for the ratio of total acid neutral equivalents to total epoxide equivalents in the uncured curable mixture to be in the range from about 0.25 to about 5.0. However, it is preferred that this acid to epoxide (A/E) ratio be in the range from about 1:1 to about 3:1.

In most circumstances, it will be found desirable to employ an accelerator to speed up the reaction between the 1,2-epoxy resin and the cross-linking agent. Any suitable accelerator known to the art will be acceptable. Typical accelerators can include, for example, tin octanoate, zinc acetylacetonate and benzyldimethylamine. We have found, that for most applications the preferred accelerator will be tin octanoate.

In preparing the curable mixture, it will typically be the case that the epoxy resin, acid cross-linking agent and accelerator will be ground together so as to assure intimate contact among the various components. This will also prepare the curable mixture in the form of a fine powder, which therefore enables it to be utilized as a molding powder as soon as the subsequent treating step is accomplished. In this comminution stage, it is preferred to mix the components of the curable mixture in a ball mill, using Burundum balls for about 1 to 24 hours, preferably for about 16 to about 24 hours, at ambient temperature and pressure conditions, until the particle size has been reduced to the stage where substantially all particles will pass through a 50 mesh screen.

The curable mixture prepared according to the procedures outlined above is thereafter subjected to a precure heating step, at temperatures between about 50° to 150° C., for from about 5 minutes to about 6 hours. This precure step is critical in order to obtain a moldable epoxy resin composition. The precure conditions will depend to some extent on the particular components of the curable mixture utilized. Those skilled in this art will be able to determine the appropriate optimum parameters with minimal routine experimentation. It has been found preferable, however, and satisfactory for most curable mixtures, to heat the mixture after comminution to a temperature between about 80° to about 120° C., for about 15 minutes to about 3 hours. The pressure is preferably atmospheric, or ambient. However, so long as molding conditions are not reached, and depending upon the activity and initial stability of the acid cross-linking agent employed, the pressure can be as low as 10 millimeters of mercury to as high as about 2000 pounds per square inch gauge (13.9 MPa), or even higher.

While not wishing to be bound to any theory, but rather to aid those skilled in the art in determining the optimum precure conditions, it appears that the precure heating step, accomplished as it is after the curable mixture has been thoroughly and intimately combined, causes labile carboxyl groups on the acid cross-linking agents to link up or react partially with epoxide groups on the epoxy resin precursor materials, thus causing the acid material to be further stabilized against decarboxylation during the higher temperatures in the actual molding step. This partial stabilizing through "fixation" of the carboxyl groups, enables the moldable epoxy resin compositions produced according to the present invention to withstand relatively wide extremes of temperature, handling and storage conditions, thus making the compositions produced according to the present invention suitable for packaging for later use as molding compositions. Alternatively, molded epoxy resin products may be directly obtained by subjecting the curable mixture obtained as outlined above to the precure conditions and thereafter subjecting the resulting composition to suitable molding conditions. The solid epoxy resin materials produced thereby have particularly desirable Barcol hardness characteristics and excellent electrical characteristics, making them suitable for molding into numerous electrical components.

DETAILED DESCRIPTION OF THE INVENTION

The first component of the curable mixture prepared according to the process of the present invention is a 1,2-epoxy resin containing on average more than one 1,2-epoxy group per molecule. Any of the epoxy resins known in the art can be employed in the present invention, so long as they are capable of being cross-linked according to coupling procedures well known in the epoxy resin art. As the compositions produced according to the present invention are intended to be moldable epoxy compositions, it is desirable that the epoxy resin precursor have at least one epoxy group per molecule and have a molecular weight such that dry, powder formulations may be prepared therefrom. Epoxy resin precursors fitting within the definitions employed above and having molecular weights as low as 75 are known. The preferred range of the epoxy resins to be utilized in forming the curable mixtures of the present invention will be between about 300 to about 4000. The most preferred epoxy resins are those complex mixtures of polyethers having terminal 1,2-epoxy groups and in which alternating intermediate aliphatic hydroxy-containing radicals are linked through ether oxygens to aliphatic or aromatic nuclei. Other suitable epoxy resins include, for example, butane dioxide and limonene dioxide.

These high molecular weight complex polyether compounds are thermoplastic, but are capable of forming thermosetting compositions by further reaction through the hydroxy or the 1,2-epoxide groups with a cross-linking agent. In order to form these thermosetting compositions, the epoxy resin must have a 1,2-epoxide equivalency greater than one. By epoxide equivalency is meant the average number of 1,2-epoxide groups contained in the measured molecular weight of the resin. Since the epoxy resin is a mixture of polyethers, the measured molecular weight, upon which the 1,2-epoxide equivalency depends, is necessarily an average molecular weight. Thus, the 1,2-epoxide equivalency of the resin will be a number greater than one, but not necessarily an integer. The 1,2-epoxide equivalency can easily be determined from the measured molecular weight and the epoxide value (the number of epoxide groups per hundred grams of resin). For example, an epoxy resin having an average molecular weight of 900 and an epoxide value of 0.2 has a 1,2-epoxide equivalency of 1.8. The epoxide value of an epoxy resin can be determined experimentally by heating a one gram sample of the epoxy resin with a solution of pyridine hydrochloride with an excess of pyridine (obtained by adding 16 milliliters of concentrated hydrochloric acid to a liter of pyridine) at the boiling point for 20 minutes and then back titrating the unreacted pyridine hydrochloride with a 0.1 N NaOH to the phenolphthalein end point. In the calculations, each HCl consumed by the resin is considered to be equivalent to one epoxide group.

The more preferred epoxy resins are generally prepared by the reaction of an epihalohydrin with a polyhydric alcohol or phenol. Preferred epoxy resins are prepared by the reaction of an epichlorohydrin with a dihydric phenol and have the general formula:

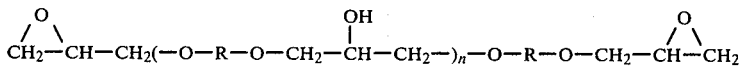

Where R is a divalent aromatic radical and n is an integer between 0 and about 18. As the ratio of the epichlorohydrin to dihydric phenol increases, the value of n decreases.

Bisphenol A [bis(4-hydroxy phenol)dimethylmethane] is perhaps the dihydric phenol most frequently employed. Thus, R in the above formula would be:

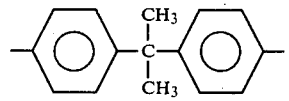

When n in the above is zero, a diglycidyl ether having the following formula results:

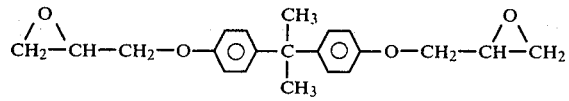

The above ether can be obtained when the mol ratio of epichlorohydrin to Bisphenol A is about 10 to 1. Lower ratios will produce higher molecular weight polyethers. The epoxide equivalent (which is defined as the weight of resin in grams containing 1 gram equivalent of epoxy) should be between 300 and 4000, preferably between 400 and 2500, which is one-half the average molecular weight. These epoxy resins are solid at room temperature (20° to 25° C.) and have a Durran melting point between about 50° C. and about 150° C. Many commercially available epoxy resins with suitable properties may be employed. For example, suitable resins include "BAKELITE ERL 2002"; "BAKELITE ERL 2003";

"EPON 1001" and "EPON 1004". "BAKELITE" is the trademark of Union Carbide Corporation and "EPON" is the trademark of the Shell Chemical Company.

Cross-linking Agent

The cross-linking agents to be employed in the curable mixtures of the present invention are polycyclic, aromatic polycarboxylic acids derived by the nitric acid oxidation of naturally occurring solid carbonaceous materials such as coal. Processes for producing these acid products are disclosed in U.S. Pat. Nos. 4,052,442, 4,137,418, 4,195,185, and 4,195,186, the disclosures of which, to the extent necessary to complete the teaching of this application and to fully enable those skilled in this art to make and use the acid products contemplated for use as cross-linking agents in the moldable compositions of the present invention, are hereby incorporated by reference. The disclosures of these patents give a more detailed discussion of the acid products in the manner and process of deriving them from carbonaceous materials such as coal.

The nitric acid oxidation of aqueous slurries of carbonaceous materials such as coal, wherein the oxidation is carried out at temperatures in the range of about 15° to about 200° C. and for about 0.5 to about 15 hours, produces mixtures of polycyclic, aromatic, polycarboxylic acids, some of which are soluble in polar solvents, such as acetone but not soluble in water, some of which are soluble in water and in polar solvents, and some of which are soluble in neither water nor polar solvents, except under extreme conditions. The manner and means by which these various components, soluble in different solvents, may be separated from the reaction product of the oxidation process, is more fully described in U.S. Pat. No. 4,052,448, incorporated above. Partially because they may be obtained without the necessity of expensive and time-consuming separation techniques, and partially because they have appropriate molecular weight and poly-functional properties, those acid products of the nitric acid oxidation of coal which are insoluble in both water and acetone are the preferred acid products for use in preparing the curable mixtures of the present invention. With this in mind, a general description of the preferred procedure for producing the acid products to be utilized in the curable mixture of the present invention will now be set forth.

In the preferred procedure, an aqueous solution of nitric acid, wherein the acid concentration ranges from about 5% to about 90% but preferably in the range from 10% to about 70%, is contacted with an aqueous slurry of carbonaceous materials such as coal in particulate form and consisting of from about 50% to about 90% water.

Suitable carbonaceous material can have the following composition on a moisture free basis:

TABLE I

|  | Weight Percent | |
| --- | --- | --- |
|  | Broad Range | Preferred Range |
| Carbon | 45-95 | 60-92 |
| Hydrogen | 2.5-7 | 4-6 |
| Oxygen | 2.0-45 | 3-25 |
| Nitrogen | 0.75-2.5 | 0.75-2.5 |
| Sulphur | 0.3-10 | 0.5-6 |

The carbon and hydrogen content of the carbonaceous material will reside primarily in multi-ring aromatic compounds (condensed or uncondensed), ether or cyclic compounds, and the like. Oxygen and nitrogen are believed to be present primarily in chemical combination. Some of the sulphur is believed to be present in chemical combination with the aromatic compounds and some in chemical combination with inorganic elements associated therewith for example iron and calcium.

In addition to the above, the solid carbonaceous material being treated will also contain solid, primarily inorganic, compounds which will not be converted to the desired organic mixture which are termed ash, and which are composed chiefly of compounds of silicon, aluminum, iron and calcium, with smaller amounts of compounds of magnesium, titanium, sodium and potassium. The ash content of the carbonaceous material treated will amount to less than about 50 weight percent, based on the moisture-free carbonaceous material, but in general, will amount to about 0.1 to about 30 weight percent, usually about 0.5 to about 20 weight percent.

Anthracitic, bituminous and subituminous coal, lignitic materials, and other type of coal products referred to in ASTM D-388 are exemplary of the solid carbonaceous material which can be treated to produce the organic mixture. Some of these carbonaceous materials in their raw state will contain relatively large amounts of water. These can be dried prior to use herein so that the carbonaceous material has a fixed carbon content that does not exceed 86 weight percent and a volatile metal content of at least about 14 weight percent as determined on an ash-free basis.

The carbonaceous material, prior to use is preferably ground in a suitable attrition machine, such as a hammer-mill, to a size such that at least 50% of the carbonaceous material will pass through a 40 mesh (U.S. series) sieve. As noted, the carbonaceous material is slurried in a suitable carrier, preferably water, prior to reaction with nitric acid. If desired the carbonaceous material can be treated, prior to reaction herein, using any conventional means, to remove therefrom any materials forming a part thereof that will not be converted in reaction with nitric acid herein.

The reaction mixture in the reactor is stirred while being maintained at a temperature of about 15° to about 200° C., preferably about 50° to about 120° C., and a pressure of about atmospheric to about 1000 pounds per square inch guage, preferably about atmospheric to about 500 pounds per square inch guage for about 0.5 to about 15 hours, preferably about 2 to about 6 hours. In order to obtain the desired mixture without losing appreciable amounts of carboxyl or nitro groups on the acids that are formed during oxidation, and to obtain the desired acids in high yields in the reactor, it is absolutely critical that the reaction conditions contained herein namely nitric acid concentration, temperature, pressure and reaction time, be correlated as to minimize and, preferably, to avoid decarboxylation and denitrofication. Gaseous products, such as nitrogen oxides, can be removed from the reactor in any suitable manner.

The reaction product removed from the reactor is found to be soluble, or reactable with, sodium hydroxide. Separation of the oxidized product from the water and nitric acid associated with it must be accomplished in a manner so that the carboxyl and nitro groups are not removed from the acid product. Distillation for the removal of the water will not suffice, because under the conditions required for such separation, a significant loss of carboxyl groups and nitro groups would occur. Mechanical separation will suffice. The reaction product is therefore led to a first separator, which can be, a filter or centrifuge.

The solids that are recovered in the separator, contain a mixture of polar solvent soluble acid products and polar solvent insoluble acid products which are soluble in sodium hydroxide. By polar solvent is meant solvents such as methanol, ethanol, isopropanol, acetone, methyl ethylketone, tetrahydrofuran, dioxane, cyclohexonone, and the like. These polycyclic, aromatic, polycarboxylic acids may be used as a cross-linking agent for this invention without further separation.

The solids that are recovered from the separation step disclosed above can be further separated into polar solvent soluble and polar solvent insoluble components. The solids are led to a second separator wherein they are subjected to extraction with a polar solvent, preferably acetone. Such separation can be carried out at a temperature of about 20° to about 60° C., preferably 25° to about 50° C., and a pressure of about atmospheric to about 500 pounds per square inch guage, preferably about atmospheric to about 100 pounds per square inch guage. The solid material, insoluble in acetone, is removed from the second separator. These solids are polar solvent insoluble, water insoluble polycyclic, aromatic, polycarboxylic acids which can be used as cross-linking agents in this invention.

The polar solvent solution from the second separator is then led to a drier wherein the polar solvent is separated from the polar solvent soluble, water insoluble polycyclic, aromatic, polycarboxylic acid. As before, the acid mixture must be removed from the acetone by so correlating the conditions as to minimize and, preferably, avoid, decarboxylation and denitrofication. This separation could be accomplished by use of a drier; the temperature can be in the range of about 10° to about 60° C., preferably about 20° to about 50° C., the pressure can be about 10 millimeters of mercury to about atmospheric, preferably about 30 millimeters of mercury to about atmospheric, for about 0.5 to about 24 hours, preferably about 1 to about 5 hours.

The filtrate obtained in the first separation will contain water, nitric acid, most of the inorganic material (ash) that was present in the carbonaceous charge and polar solvent soluble, water soluble polycyclic, aromatic, polycarboxylic acids which may be used as crosslinking agents in this invention. Separation of the filtrate into its component parts can be effected as follows: the filtrate can be passed to a distillation tower maintained at a temperature of about 50° to about 100° C., preferably about 70° to about 90° C., and a pressure of about 10 millimeters of mercury to about atmospheric preferably about 30 millimeters of mercury to about atmospheric. Under these conditions nitric acid and water are removed from the distillation tower. The residual solids are led to a separator where they are subjected to extraction with a polar solvent, preferably acetone. The extraction can be carried out at a temperature of about 20° to about 60° C., preferably about 25° to about 50° C., and a pressure of about atmospheric to about 500 pounds per square inch guage, preferably about atmospheric to about 100 pounds per square inch guage. The solid material (ash) is separated from the solution in any convenient manner, for example, filtration. The polar solvent solution can then be led to a drier wherein the polar solvent is separated and the desired polar solvent soluble, water soluble polycyclic, aromatic, polycarboxylic acids are recovered. The temperature in the drier can be in the range of about 10° to about 60° C., preferably about 20° to about 50° C., the pressure can be about 10 millimeters of mercury to about atmospheric, preferably about 30 millimeters of mercury to about atmospheric, for about 0.5 to about 24 hours, preferably about 1 to about 5 hours.

EXAMPLES

The present invention will now be described with reference to specific examples. Such examples are presented for purposes of illustration only, and shall not under any circumstances be deemed as limiting the present invention. Unless otherwise indicated, all percentages will be set forth as weight percentages.

A number of curable mixtures were prepared according to the process of the present invention and subjected to several different molding conditions. To demonstrate the significance of the precure step, several different precures were carried out. In the preparation of the curable mixtures of the present invention, acid products, identified as A through G, were prepared by the nitric acid oxidation of coal according to the following procedure.

Into a one gallon autoclave equipped with a mechanical stirrer and cooling coils there were charged 320 milliliters of water and 100 milliliters of 70% aqueous nitric acid. This mixture was heated to 80° C. and maintained at this temperature during the run. There was then concurrently added to the reactor over a period of 1 to 2 hours 290 milliliters of 70% aqueous nitric acid and 800 grams of powdered North Dakota lignite. Over an additional period of 8 hours there was added an additional 210 milliliters of 70% aqueous nitric acid. During the entire reaction period the reaction mixture was maintained at autogeneous pressure. The resulting mixture was then maintained at the designated temperature for five hours, cooled to room temperature and then removed from the reactor and filtered. The recovered solids were washed three times, each time using 1000 milliliters of water, and dried in a vacuum oven, resulting in 571 grams of material. This material composed of polycyclic, aromatic, polycarboxylic acids is identified in Table I as the Coal Acid mixture C. One hundred grams of Coal Acid C were extracted with five liters of a mixture containing 90 volume percent methylethylketone and 10 volume percent water. The extract was dried to remove methylethylketone and water therefrom, resulting in the production of 61.5 grams of solvent soluble, polycyclic, aromatic, polycarboxylic acids, identified in Table I as Coal Acid A. The material insoluble in the methylethylketone are also polycyclic, aromatic, polycarboxylic acids and are identified in Table I as Coal Acid F. The same procedure was used on another occasion. The solvent soluble, polycyclic, aromatic, polycarboxylic acids recovered are identified in Table I as Coal Acid G.

Into a one gallon glass reactor equipped with a mechanical stirrer and heating and cooling coils there were charged 320 milliliters of water and 100 milliliters of 70% aqueous nitric acid. This mixture was heated to 80° C. and maintained at this temperature during the run. There was then concurrently added to the reactor over a period of one to seven hours 425 milliliters of 70% aqueous nitric acid and 800 grams of powdered Belle Ayre coal. Over an additional period of three hours an additional 575 milliliters of 70% aqueous nitric acid were added. During the entire reaction period the reaction mixture was maintained at autogeneous pressure. The resulting mixture was then maintained at the designated temperature for one hour, cooled to room temperature and then removed from the reactor and filtered. The recovered solids were washed three times, each time with 1000 milliliters of water, and dried in a vacuum oven, resulting in the recovery of 498 grams of material, of which 100 grams were extracted with five liters of a mixture containing 90 volume percent methylethylketone and 10 volume percent water. The extract was dried to remove methylethylketone and water therefrom, resulting in the production of 66.7 grams of solvent soluble, polycyclic, aromatic, polycarboxylic acids, identified in Table I as Coal Acid B.

Into a 30 gallon glass-lined reactor equipped with a mechanical stirrer and heating and cooling coils there were charged 55 pounds of water and 4.56 liters of 70% aqueous nitric acid. This solution was mixed and heated to 60° C. A mixture containing 45 pounds of North Dakota lignite in 45 pounds of water was added at the rate of one pound per minute until 60 pounds were added. The temperature was maintained at 60° C. during the addition and then for an additional three hours thereafter. The reaction product was cooled to room temperature and discharged from the reactor. Two gallons of the product were filtered and the filter cake washed with water. The recovered solids, which were polycyclic, aromatic polycarboxylic acids, were dried in a vacuum oven. These are identified in Table I as Coal Acid D.

To a five gallon stainless steel autoclave there were charged 650 milliliters of 70% aqueous nitric acid and 3900 milliliters of water. The reactor mixture was heated to 60° C. and a slurry comprised of 2000 grams of North Dakota lignite and 2000 grams of water was added thereto over a one hour period. The mixture was stirred for three hours at 60° C., cooled, filtered and washed twice, each time with 2000 milliliters of water. The water-insoluble, polycyclic, aromatic, polycarboxylic acids were dried in a vacuum oven at 50° C. using a nitrogen purge. These are identified in Table I as Coal Acid E.

A powder formulation was prepared using 21.5 grams of Coal Acids A, 30.0 grams of Epon 1001 and 0.3 of tin octanoate as accelerator. The acid to epoxide ratio was 1.5. The acid to epoxide ratio is the ratio of total acid equivalents to total epoxide equivalents in an uncured resin formulation. The powder formulation was added to a ball mill using Burundum balls for 16 hours. Substantially all of the powder so obtained passed through a 50 mesh screen. The powder was molded into a disc shape, having a diameter of 2.54 centimeters and a thickness of 0.5 centimeter using a temperature of 165° C. and a pressure of 2000 pounds per square inch guage (13.9 MPa) for one hour. The disc was cooled in the mold under pressure to ambient temperature. The sample disc was brittle and cracked when attempts were made to take a Barcol hardness. This example is identified in Table I below as Example I.

Several addition runs were made where the mixtures were subjected to a pressure prior to molding. Additionally other coal acids were also used and additional parameters were explored. These data are also summarized below in Table I.

A comparison of Example I with the remaining runs in Table II shows that employment of a precure step prior to molding is critical in order to obtain a molded resin having a satisfactory Barcol hardness. In Table II it is seen that the molded resin produced herein possesses satisfactory electrical properties.

TABLE I

| Example | Coal Acid | Neutral Equivalent of Coal Acid | Acid/Epoxide Ratio | Weight, Grams Coal Acid | Weight, Grams Epoxide | Precure Hours | Precure T,°C. | Barcol Hardness (ASTM-D2583) |
|---------|-----------|-------------------------------|--------------------|-----------------------|----------------------|---------------|---------------|------------------------------|
| I | A | 215 | 1.5 | 21.5 | 30.0 | None | | 0 |
| II | A | 215 | 1.5 | 21.5 | 30.0 | 0.5 | 100 | 20 |
| III | A | 215 | 1.0 | 14.3 | 30.0 | 0.5 | 100 | 12 |
| IV | A | 215 | 2.0 | 28.6 | 30.0 | 0.5 | 100 | 25 |
| V | A | 215 | 3.0 | 42.9 | 30.0 | 0.5 | 100 | 27 |
| VI | B | 250 | 3.0 | 49.9 | 30.0 | 0.5 | 100 | 18 |
| VII | C | 240 | 3.0 | 47.9 | 30.0 | 0.5 | 100 | 30 |
| VIII | D | 331 | 3.0 | 66.1 | 30.0 | 0.5 | 100 | 30 |
| IX | E | 230 | 1.0 | 15.3 | 30.0 | 1.0 | 80 | 22 |
| X | E | 230 | 2.0 | 30.6 | 30.0 | 1.0 | 80 | 24 |
| XI | E | 230 | 3.0 | 45.9 | 30.0 | 1.0 | 80 | 28 |
| XII | F | 233 | 3.0 | 46.5 | 30.0 | 0.25 | 120 | 18 |
| XIII | G | 167 | 3.0 | 33.4 | 30.0 | 0.25 | 120 | 8 |
| XIV | G | 167 | 3.0 | 33.4 | 30.0 | 1.0 | 80 | 12 |
| XV | G | 167 | 3.0 | 33.4 | 30.0 | 0.5 | 100 | 10 |

TABLE II

| | (ASTM D-150) | | | | | |
|---|---|---|---|---|---|---|
| | Dielectric Constant | | | Dissipation Factor | | |
| Example | 60 Hz | $10^3$ Hz | $10^6$ Hz | 60 Hz | $10^3$ Hz | $10^6$ Hz |
| VIII | 4.9 | 4.9 | 3.9 | 0.033 | 0.0017 | 0.005 |
| IX | 4.9 | 4.9 | 2.8 | Not taken | 0.001 | 0.004 |
| X | 4.8 | 4.7 | 3.8 | 0.004 | 0.001 | 0.004 |
| XI | 3.0 | 5.0 | 3.3 | Not taken | 0.003 | 0.004 |

The foregoing description has been directed to particular embodiments of the invention in accordance with the requirements of the Patent Statutes and for purposes of illustration and explanation. It will be apparent, however, to those skilled in this art that many modifications and changes in the procedures set forth will be possible without departing from the scope and spirit of the invention. It is applicant's intention that the following claims be interpreted to embrace all such modifications and variations.

We claim:

1. A process for preparing a molded resin product which comprises subjecting a curable mixture comprising:
    (a) a 1,2-epoxy resin containing on the average more than one 1,2-epoxy group per molecule;

(b) a mixture of polycyclic, aromatic, polycarboxylic acids obtained from the aqueous nitric acid oxidation of naturally occurring solid carbonaceous material;

(c) an accelerator;

to a temperature of about 50° to about 150° C. for about five minutes to about 6 hours and thereafter subjecting the resulting composition to molding conditions.

2. A process of claim 1 wherein the mixture of polycyclic, aromatic, polycarboxylic acids is prepared by subjecting a water slurry of coal to reaction with aqueous nitric acid having a concentration of about 5% to about 90% by weight at a temperature of about 15° to about 200° C. for about 0.5 to about 15 hours.

3. The process of claim 1 wherein the curable mixture is subjected to a temperature of about 80° to about 120° C. for about 15 minutes to about 3 hours prior to subjecting the resulting composition to molding conditions.

4. The process of claim 2 wherein the acid/epoxide ratio of said curable mixture is in the range from about 0.25 to about 5.

5. The process of claim 4 wherein the acid/epoxide ratio of said curable mixture is in the range from about 1 to about 3.

6. The epoxy resin product prepared by the process of claim 1.

7. The epoxy resin product prepared by the process of claim 2.

8. The epoxy resin product prepared by the process of claim 3.

9. An epoxy resin product prepared by the process of claim 4.

10. An epoxy resin product prepared by the process of claim 5.

11. The process for producing a moldable epoxy resin composition capable of being cured under suitable molding conditions into a solid resinous material having improved Barcol hardness characteristics which comprises:

(a) Preparing a curable mixture of
  (i) a 1,2-epoxy resin having an epoxide equivalent between about 400 and about 2500, a molecular weight between about 75 to 4000 and a Durran melting point between about 50° to 150° C.;
  (ii) the acid product obtained from the nitric acid oxidation of naturally occurring solid carbonaceous material, said acid product having a neutral equivalent between about 150 and about 350; and
  (iii) a suitable accelerator;

wherein the ratio of total acid neutral equivalents to total epoxide equivalents ranges from about 0.25 to about 5.0; and (b) subjecting said curable mixture to an increased temperature, in the range between about 50° C. to about 150° C. but not under molding pressure and temperature conditions, for a period of about 5 minutes to about 6 hours.

12. The process of claim 11 wherein the acid product employed to prepare the curable mixture is derived by subjecting a slurry containing coal to reaction with aqueous nitric acid having a concentration of about 5% to about 90% at a temperature of about 15° C. to about 200° C. for about 0.5 to about 15 hours.

13. The process of claim 12 wherein the acid product is insoluble in both water and polar solvent.

14. The moldable composition produced by the process of claim 11.

15. The moldable composition produced by the process of claim 12.

16. The moldable composition produced by the process of claim 13.

* * * * *